Patented Sept. 24, 1946

2,408,065

UNITED STATES PATENT OFFICE 2,408,065

STARCH-MELAMINE MOLDING COMPOSITION

Donald W. Hansen, Decatur, Ill., assignor to A. E. Staley Manufacturing Company, Decatur, Ill., a corporation of Delaware No Drawing. Application January 20, 1943, Serial No. 472,995

1 Claim. (Cl. 260—9)

This invention relates to improvements in the manufacture of molding compositions. More particularly, it pertains to molding compositions and molded products constituting a combination of an amylaceous material and a resin, or a resin-forming material with an aldehyde, such as, for example, starch and a melamine-formaldehyde condensation product.

Generally, it is an object of the present invention to provide a molding composition containing a particular type of resin or resin-forming materials and a predominant amount of starch from which can be made molded products which are economical of manufacture and substantially on a par with conventional compositions and products.

A principal object of the invention is the provision of a molding composition containing a major part of a relatively inexpensive material, such as starch, and a resin or resin-forming material having an amino group, such as melamine-formaldehyde condensation product, which will react with the starch to form a desired molded product.

Other objects of the invention will in part be obvious and will in part appear hereinafter.

The invention accordingly comprises a composition of matter possessing the characteristics, properties and the relation of components which will be exemplified in the composition hereinafter described and the scope of the application of which will be indicated in the claim.

Briefly, the present invention contemplates a resinous composition, more specifically a molding compound consisting of an amino-triazine-aldehyde resin, preferably melamine-formaldehyde, and the balance an amylaceous material, preferably starch. The high flexural strength and particularly the high resistance to water of the molded products which I obtained, and the high plastic flow of the molding compositions, consisting of a melamine-formaldehyde resin and a major portion of starch was wholly unexpected. For example, in support of the foregoing, when using 25 parts of melamine-formaldehyde resin and 75 parts of starch the strength, water resistance and flow compare favorably with present conventional thermosetting molding compositions. The molding compositions described in this invention have high flow, requiring no great pressures in the molding operation and will cure rapidly when molded at the usual temperature of about 150° C. Also, this molding composition is capable of being stored for long periods of time without significant alterations in these properties. The molded product obtained has desirable transparency and translucency characteristics and are substantially colorless. These characteristics can be modified by properly controlling the various manipulative steps of the process herein disclosed. A suitable alkali, as for example, lime can be added to modify the flow and storage characteristics. A suitable material which will tend to bring about an acid reaction during the molding operation, as for example ammonium chloride, can also be added to accelerate the curing operation.

The resin and starch may be mixed together in any suitable manner. The substantially dry resin and dry starch and any of the additional materials described above can be ground together in a ball or rod mill. Another procedure, which is preferred, is to dissolve the resin in water and to mix the resin solution with the starch and other additional materials. The resulting composition is then rolled on mills customarily used in the plastic and rubber industry. The ratio of the differential speed of the rolls is usually in the neighborhood of about 1.1 to 1. It is preferred to operate these mills at about 25° C. After rolling for about 3 minutes, the composition is cooled, ground to any suitable size and dried to a moisture content of around approximately 6 per cent. Preferably the pH of the molding composition should be alkaline when suspended in water and specifically between the pH range of 7.0 to 11.0.

The moisture content of the resulting molding powder composition was determined by drying approximately 2 grams in an air oven at 105° C. for 3 hours.

The water absorption was measured by the A. S. T. M. specification in which a disk 2 inches in diameter and ⅛ inch thick, molded at 5,000 pounds per square inch and 150° C. for 3 minutes, is conditioned for 1 hour at 105° C. The disk is immersed on an edge for 24 hours in water at 25° C. After wiping dry the gain in weight is reported as the water absorption in percentage of the original weight.

The flow rate of the composition was measured by a parallel plate plastometer in which a preformed cylindrical pellet ⅜ inch in diameter and ⅜ inch long is placed between two platens whose temperatures are maintained at 150° C. when a 5 kilogram load is applied to the upper movable platen. Under heat and pressure the pellets tend to flatten for a period of time until the heat reactive resins set up and prevent further flow. The change in height of the pellet in mils (0.001 inch) is arbitrarily termed the flow. The greater the flow the more suitable is the material for intricate molded articles.

The pH of the molding composition was determined by suspending 10 grams of the material in 100 ml. of neutral distilled water, shaking for ½ hour in a stoppered flask, and determining the pH electrometrically by means of a glass electrode.

By observation it was determined that the water absorption increases and the flow decreases rapidly when the resin content is less than 25 parts and the starch content more than 75 parts.

The effects of pH and moisture content were also observed on a composition of 25 parts of melamine-formaldehyde resin and 75 parts of starch by the addition of varying amounts of suitable acid or alkali. The resulting composition using a commercial melamine-formaldehyde resin (Melmac S-77-V), had a pH of 6.3 and a flow of 42 mils at a moisture content of 5 per cent. This flow is about the minimum flow that is used in commercial molding practice. Compositions in which varying amounts of an acid, such as 10 per cent hydrochloric acid, was added during the mixing operation, gave products with pH values extending to 3.0 pH. The flow of these compositions successively decreased with pH. The addition of varying amounts of alkali, such as lime, extending the pH range to 11 brought about an increase in flow.

The moisture content of the molding composition, it was observed, had a marked effect on the flow rate, the latter increasing directly as the former. At a pH of 9.0, the flow of 45 mils can be obtained with only 5 per cent moisture which is considered to be a desirable range. As the pH increases to 11 the flow slowly increases for a fixed moisture content. The most suitable flow can be obtained if the composition has a pH slightly greater than 7.0.

Other observations made showed that the flexural strength of the specific molding composition ranged from about 9,000 pounds to 14,000 pounds per square inch.

A chemical reaction takes place between the starch and the melamine-formaldehyde resin. The reason for this it seems is due to the fact that the melamine-formaldehyde resin has an additional amino group by which this reaction occurs. Also, another possible mechanism seems to be that the melamine-formaldehyde resins form an ether linkage with the hydroxyls of the starch.

Example I 25 parts of a commercial melamine-formaldehyde resin in powder form (Melmac S-77-V), was dissolved in 12½ parts of water. To 75 parts of starch was added 5 parts of water and 0.05 part of lime, mixed, and thereafter was added the above resin solution. The mixing was done in a kneader type of mixer for a period of 1 hour to insure complete uniformity of the composition. The material was then rolled for 3 minutes on a differential mill operated at 25° C., after which period it was cut from the rolls, cooled, and ground to approximately 10 mesh. It was then dried to a moisture content of about 6 per cent. The composition had a pH of 7.1 and a flow of 90 mils. The water absorption was 1.64 per cent and the flexural strength 9,990 pounds per square inch as measured by the A. S. T. M. tentative procedure.

Example II 25 parts of a commercial melamine-formaldehyde resin in powder form (Melmac S-77-V), was dissolved in 12½ parts of water. To 75 parts of starch was added 5 parts of water and 0.1 part of lime, mixed, and thereafter was added the above resin solution. The mixing was done in a kneader type of mixer for a period of 1 hour to insure complete uniformity of the composition. The material was then rolled for 3 minutes on a differential mill operated at about 25° C. Thereafter it was cut from the roll, cooled, and ground to approximately 10 mesh. It was then dried to a moisture content of about 6 per cent. The composition had a pH of 9.1 and a flow of 180 mils at 6 per cent moisture content.

Example III 25 parts of a commercial melamine-formaldehyde resin in powder form (Melmac S-77-V), was dissolved in 12½ parts of water. To 75 parts of starch was added 5 parts of water and 0.6 part of lime and 0.6 part of ammonium chloride. This was mixed and thereafter was added the above resin solution. The mixing was done in a kneader type of mixer for a period of 1 hour to insure complete uniformity of the composition. The material was then rolled for 3 minutes on a differential mill operated at 25° C. Thereafter it was cut from the rolls, cooled, and ground to approximately 10 mesh. It was then dried to a moisture content of about 6 per cent. The composition had a pH of 8.4 and a flow of 45 mils at 6 per cent moisture content. The water absorption was 2.0 per cent and the flexural strength 9,990 pounds per square inch. This sample cured more rapidly than those of previous examples.

Example IV 30 parts of a commercial melamine-formaldehyde resin in powder form (Melmac S-77-V), was dissolved in 15 parts of water. This was added to 70 parts of starch and 0.6 part of lime. This was mixed in a kneader type of mixer for a period of 1 hour to insure complete uniformity of the composition. The material was then rolled for 3 minutes on a differential mill operated at about 25° C. Thereafter it was cut from the rolls, cooled, and ground to approximately 10 mesh. It was then dried to a moisture content of about 6 per cent. The composition had a pH of 9.9 and a flow of 150 mils at 6 per cent moisture content. The water absorption was 1.01 per cent and the flexural strength 14,195 pounds per square inch.

Example V 25 parts of a commercial melamine-formaldehyde resin in powder form, (Melmac S-77-V,) was dissolved in 12½ parts of water. This was then added to 52½ parts of starch, 5 parts of water, 22½ parts of alpha flock (a purified cellulose filler) 0.6 part of lime and 0.6 part of ammonium chloride. The mixing was done in a kneader type of mixer for a period of 1 hour to insure complete uniformity of the composition. The material was then rolled for 3 minutes on a differential mill operated at 25° C. Thereafter it was cut from the rolls, cooled, and ground to approximately 10 mesh. It was then dried to a moisture content of about 6 per cent. The composition had a pH of 8.9 and a flow of 33 mils at 6 per cent moisture content. Water absorption was 1.36 per cent and the flexural strength 12,520 pounds per square inch.

Example VI 50.4 parts of melamine and 81 parts of aqueous neutral formaldehyde (37 per cent HCHO by weight) were heated together for 30 minutes at 80° C. 121 parts of the resulting resin solution was mixed with 150 parts of powdered starch, and milled and dried as in Example I. The resulting composition had a pH of 6.8 and a flow of 90 mils at 6 per cent moisture content. The water absorption was 1.45 per cent.

Numerous other resinous compositions were made up in which the ranges of resin to starch varied between 15 to 49 parts and 51 to 85 parts respectively. The moisture contents had a range of approximately between 4.0 and about 7.0. The water absorption characteristics had a range of from about 1.0 to 16.0 and the flow rate in mils from 6 to 126, all of the ranges given being approximate merely.

Among other resins or resin-forming materials considered in connection with the foregoing, and the group of which melamine is a member, are the amino-triazines. Specifically, this group includes: 2, 4, 6, triamino-1, 3, 5, triazine; 2, 4 amino-1, 3, 5 triazine; 2, 4 amino-3 hydroxyl-1, 3, 5, triazine; aminomethyleneamino-1, 3, 5, triazine; diacetylamino-1, 3, 5 triazine.

It will thus be seen that the objects hereinbefore set forth may readily and efficiently be attained and since certain changes may be made in the above composition of matter and different embodiments of the invention could be made without departing from its scope, it is intended that all matter contained in the above description shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

A plastic molding composition comprising a reaction product of about 70 to 75 parts of starch and about 25 to 30 parts of a melamine-formaldehyde condensation product, said composition having a degree of alkalinity lying within the range of 7 to 11 pH and having a flow rate of from 33 to 180 mils when a preformed cylindrical pellet of such composition $3/8$ of an inch in diameter and $3/8$ of an inch long is placed between platen members at a temperature maintained at 150° C. when a 5 kilogram load is applied thereto; a moisture content of around 6 per cent as determined by drying approximately 2 grams in an air oven at 105° C. for 3 hours; a water absorption represented by a percentage gain in weight lying within the range of 1.01 to 2.01 when a disk 2 inches in diameter and $1/8$ inch thick, molded at 5,000 pounds per square inch and 150° C. for 3 minutes, is conditioned for one hour at 105° C., immersed on an edge for 24 hours in water at 25° C. and wiped dry; and a flexural strength, when molded into an article, ranging from about 9,900 pounds to 14,195 pounds per square inch.

DONALD W. HANSEN.